United States Patent [19]

Sims, Jr.

[11] Patent Number: 4,591,934
[45] Date of Patent: May 27, 1986

[54] CARTRIDGE LATCHING MECHANISM

[75] Inventor: Dewey M. Sims, Jr., Wayne, Mich.

[73] Assignee: Northern Telecom Limited, Montreal, Canada

[21] Appl. No.: 444,478

[22] Filed: Nov. 24, 1982

[51] Int. Cl.$^4$ ............... G11B 17/00; G11B 23/02; G03B 1/04
[52] U.S. Cl. .................... 360/93; 360/132; 360/96.5; 242/198
[58] Field of Search ............ 360/96.5, 96.6, 93, 360/85, 132; 242/198; 267/158, 159

[56] References Cited

U.S. PATENT DOCUMENTS

| | | | |
|---|---|---|---|
| 2,658,972 | 11/1953 | Brown | 267/159 X |
| 2,772,086 | 11/1956 | Foster | 267/159 X |
| 2,848,263 | 8/1958 | Miller . | |
| 2,966,066 | 5/1957 | Looker | 267/158 X |
| 3,297,156 | 1/1967 | Strauss | 267/159 X |
| 3,617,065 | 11/1971 | Camras . | |
| 3,713,681 | 1/1973 | Worley . | |
| 3,882,542 | 5/1975 | Nakamichi | 360/96 |
| 3,957,225 | 5/1976 | Vogel | 242/198 |
| 3,976,262 | 8/1976 | Kennedy | 242/192 |
| 3,977,624 | 8/1976 | Leifer et al. | 242/198 |
| 4,156,260 | 5/1979 | Joshi | 306/96.1 |
| 4,303,955 | 12/1981 | Kramer et al. | 360/93 |
| 4,337,908 | 7/1982 | Sims, Jr. | 242/198 |

FOREIGN PATENT DOCUMENTS 931193 7/1973 Canada ................. 267/159

Primary Examiner—A. J. Heinz
Assistant Examiner—Benjamin E. Urcia
Attorney, Agent, or Firm—Schwartz, Jeffery, Schwaab, Mack, Blumenthal & Evans

[57] ABSTRACT

A relatively simple latching mechanism for a tape cartridge is disclosed. In one embodiment of the present invention, each latching mechanism (of which there are two in the preferred embodiment) comprises but two separate components. Each latching mechanism comprises one camming member and one buckling column spring. The springs bias the camming members in a first position such that a portion of the camming member protrudes into the path the cartridge will travel as it is inserted into the tape machine. When the cartridge is inserted, the leading edge of the cartridge engages that portion of the camming member. The camming member is pivoted and moves to a second position; the camming member comes to rest in its second position, in engagement with the notch provided as a standard feature on the bottom edge of the cartridge. Removal of the cartridge is accomplished by manually pulling the cartridge out of the tape machine.

2 Claims, 8 Drawing Figures

CARTRIDGE LATCHING MECHANISM

BACKGROUND OF THE INVENTION

This invention relates generally to the field of tape recording, and more particularly to a latching mechanism for securing a tape carrier (such as a tape cartridge) to a tape machine.

Tape cassettes and tape cartridges are two well known types of tape carriers. One standard type of tape cartridge is the model DC-300A data cartridge manufactured by 3M.

Many schemes have been proposed to hold and latch a tape cartridge into a tape machine. The following U.S. patents depict some of these various schemes and attention is directed to them:

U.S. Pat. No. 4,337,908 issued July 6, 1982 to D. M. Sims, Jr.;

U.S. Pat. No. 4,156,260 issued May 22, 1979 to U. W. Joshi;

U.S. Pat. No. 3,976,262 issued Aug. 24, 1976 to C. J. Kennedy;

U.S. Pat. No. 3,957,225 issued May 18, 1976 to G. G. Vogel; and

U.S. Pat. No. 3,977,624 issued Aug. 31, 1976 to N. A. Leifer et al.

Briefly stated, the previous schemes for holding and latching the cartridge into a tape machine incorporate two rails, one on each side of the recess designed to accept the tape cartridge. The rails are situated so as to mate with two recesses, one on each side of the cartridge, and guide the cartridge into the recess, and to become properly positioned relative to the tape head and tape drive mechanism.

In addition to the previously mentioned rails, there is also a latching mechanism to retain the cartridge in its proper position. This latching mechanism also commonly includes a provision for providing the fine positioning of the cartridge (see for example, the aforementioned U.S. Pat. No. 4,156,260).

As can been seen from a review of the existing cartridge latching mechanisms, the mechanisms can be relatively complex and involve the use of interacting components and springs.

Aforementioned U.S. Pat. Nos. 3,957,225 and 3,977,624 are perhaps the least complicated of the cited references. Even they, however, are not as simple as they might be. This will become more apparent as the present invention is decribed in detail and its relative simplicity appreciated. In short, U.S. Pat. No. 3,957,225 employs a helical spring 35, a spring guide 37, a pivot guide 41 into which spring guide 37 is allowed to freely pass, etc. U.S. Pat. No. 3,977,624 employs a helical spring 59, and each cam 50 has a slot 58 in which a spring slide 64 moves.

SUMMARY OF THE INVENTION

The present invention is directed to reducing much of the complexity of the prior art latching mechanisms and to providing a relatively simple, yet effective, cartridge latching mechanism.

In one embodiment of the present invention, each latching mechanism (of which there are two in the preferred embodiment) itself comprises but two separate components. The only substantial movement involved in the apparatus of the present invention is that of rotation and flexing. The cartridge is guided by rails, and the latching function, in the preferred embodiment of the present invention, is performed by two latching mechanisms each comprising one camming member and one spring. One latching mechanism is located on one side of the cartridge and the other latching mechanism on the other side of the cartridge.

The camming members are positioned just below the cavity for receiving the cartridge, and adjacent to the aforementioned rails. The springs bias the camming members in a first stable position such that a portion of the camming member protrudes into the path the cartridge will travel as it is inserted into the tape machine. When the cartridge is inserted, the leading edge of the cartridge engages that portion of the camming member. The camming member is pivoted and moves to a second stable position (due to the action both of its associated spring and to the continued forward movement of the cartridge). The camming member comes to rest in its second stable postion, in engagement with the notch provided as a standard feature on the bottom edge of the cartridge. In this second position the camming member forces the cartridge forward against suitable stops to assure that the cartridge is properly located. The camming member is pivoted and biased by its associated spring so as to provide a "toggle" or "over-center" action; thus latching the cartridge in place. Removal of the cartridge is accomplished by manually pulling the cartridge out of the tape machine. The use of manual force overcomes the biasing action of the springs and the camming members move in the opposite direction as they did upon insertion of the cartridge. In a second embodiment of the present invention an eject (or release) mechanism is provided to act upon the latch to thereby cause the cartridge to be discharged.

Stated in other terms, the present invention is a latching mechanism for latching a cartridge into a holder, the mechanism comprising: a camming member situated so as to be able to engage a notch in the cartridge; the camming member having a first surface contacted by the forward edge of the cartridge both during the insertion of the cartridge and during the discharge of the cartridge, and a second surface for engaging the notch in the cartridge so as to urge the cartridge into the holder, thereby providing the latching function; the camming member being pivoted about a pivot point and having a first stable position and a second stable position; a buckling column spring having one end secured to a lever arm protruding from the camming member and having its other end fixed such that the spring biases the camming member to its first stable position when there is no cartridge in the holder and biases the camming member to its second stable position when a cartridge is properly positioned in the holder.

Stated in yet other terms, the present invention is a device for latching a tape cartridge into a holder, the device comprising: two camming members, each spaced apart so as to be able to engage notches in opposite sides of the cartridge; each camming member having a first surface contacted by the forward edge of the cartridge both during the insertion of the cartridge and during the discharge of the cartridge, and a second surface for engaging a notch in the cartridge so as to urge the cartridge into the holder, thereby providing the latching function; each camming member being pivoted about a respective pivot point and having a first stable position and a second stable position; a buckling column spring for each camming member, the spring having one end secured to a lever arm protruding from the camming member and having its other end fixed such that the spring biases the camming member to its first stable position when there is no cartridge in the holder and biases the camming member to its second stable position when a cartridge is properly positioned in the holder.

BRIEF DESCRIPTION OF THE DRAWINGS

The invention will now be described in more detail with reference to the accompanying drawings, wherein like parts in each of the several figures are identified by the same reference character, and wherein.

DETAILED DESCRIPTION

Figure 1:
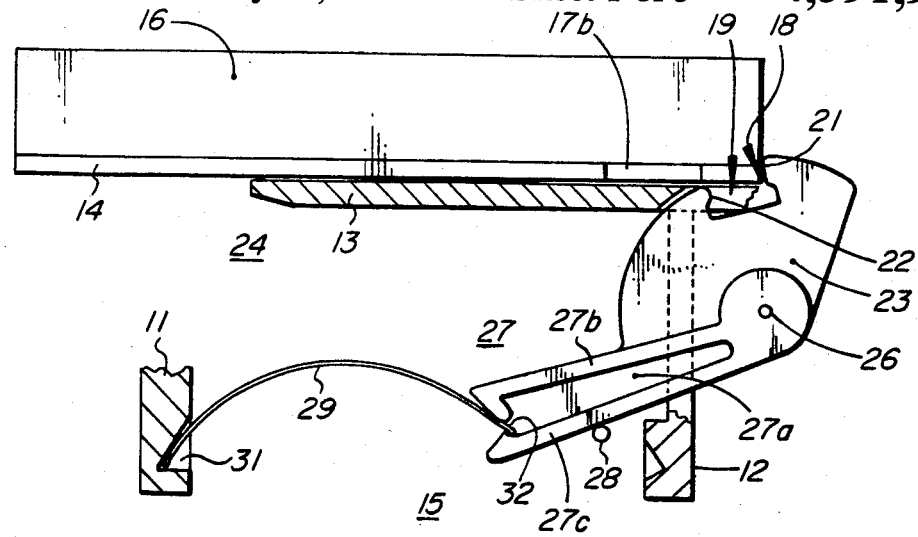
FIG. 1 is a side view of the latching mechanism of the present invention depicted in its first stable state.
Figure 3:
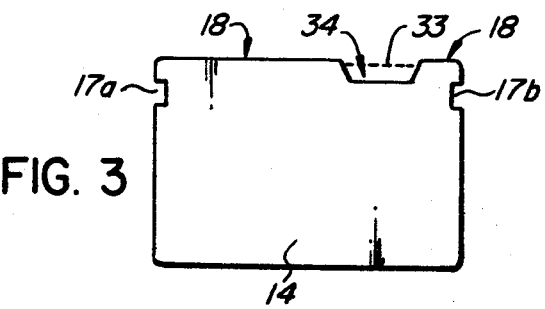
FIG. 3 is a simplified plan view of the bottom plate of a tape cartridge upon which the present invention operates in performing its latching function.

FIG. 1 depicts a partially cut away and simplified equipment housing 10 comprised of in part, a front vertical wall 11, an internal vertical wall 12, and an internal horizontal wall 13. A latching mechanism 15 comprising cam (or camming member) 23 and buckling column spring 29 is additionally depicted. The base plate 14 of a tape cartridge 16 is shown above the horizontal wall 13. Base plate 14 contains notches 17a and 17b of which only notch 17b is visible in FIG. 1 (see FIG. 3 for a complete plan view of base plate 14). Base plate 14 also has a leading edge 18 depicted just touching tang 21 of cam (or camming member) 23.

In FIG. 1, cartridge 16 is depicted as being inserted into tape cartridge holder 24. As a result, the leading edge 18 of base plate 14 has moved from the left to the right in FIG. 1 to the point where it is now shown just touching tang 21 of cam 23. Cam 23 is depicted in its first stable position. Cam 23 protrudes through an opening 19 in horizontal wall 13, as depicted, so as to intercept the path travelled by cartridge 16. Cam 23 can pivot about pivot pin 26 and in FIG. 1 its lever arm 27 is biased against stop 28 by buckling column spring 29. Notch 31, formed in wall 11, secures a first end of spring 29 and notch 32, in the second end of spring 29, allows that end of the spring to straddle the narrow part 27a of lever arm 27 and be retained by the enlarged portions 27b and 27c of lever arm 27. Spring 29 is shown in plan view in FIG. 4.

Figure 2:
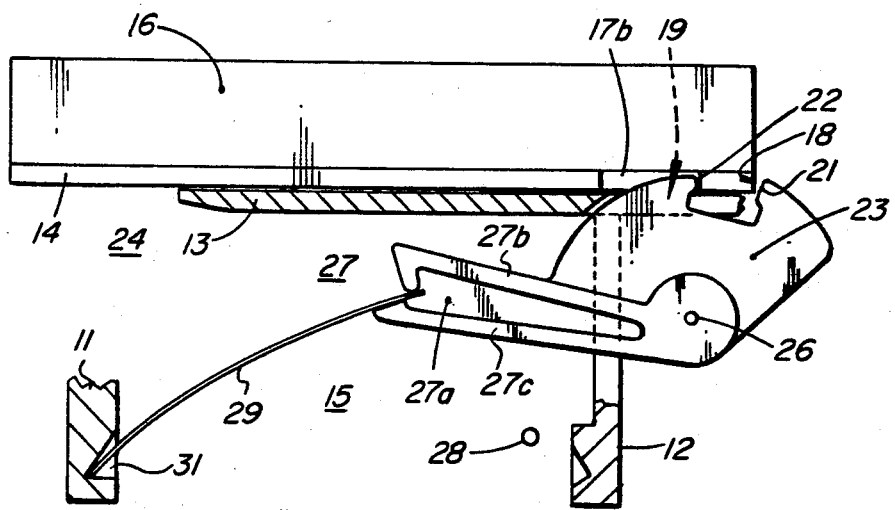
FIG. 2 is similar to FIG. 1, but depicts the latching mechanism in its second stable state.

FIG. 2 depicts tape cartridge 16 fully inserted into holder 24. It will be noted that cam 23 has rotated about pivot pin 26 to its second stable position; it is retained here by the action of spring 29. Note that leading edge 18 of base plate 14 no longer contacts tang 21. Tang 22 of cam 23, however, contacts the right side of notch 17b so as to provide a static force biasing tape cartridge 16 to the right (in FIG. 2) and consequently into contact with tape drive means and head means (not shown). Cam 23 is maintained in this second stable position by the action of spring 29 and by tang 22 engaging baseplate 14.

Note that in the FIGS. 1 and 2 embodiment, cartridge 16 is inserted by a human operator using only normal human force. To remove cartridge 16, the human operator pulls on the exposed end of cartridge 16 (at the left in FIGS. 1 and 2) thereby exerting a force to the left in the Figures. This pulling action is sufficient to overcome the force of spring 29 that is keeping cam 23 in its second stable position; this pulling action causes cam 23 to pivot to its first stable position and in the process, tang 21 contacts leading edge 18 of cartridge 16 and causes cartridge 16 to become unlatched and to be discharged.

As mentioned earlier, FIG. 3 is a plan view of baseplate 14 depicting notches 17a and 17b and leading edge 18. Dashed line 33 shows the approximate route taken by the tape across recess 34 of baseplate 14; this is where the tape is exposed so as to enable the head (not shown) to record and play back from the tape.

Figure 4:
FIG. 4 is a plan view of a spring used with the invention.

FIG. 4 is a plan view depicting spring 29. Spring 29, in the exemplary embodiment described herein, is approximately 2.14 inches long, 0.375 inches wide, and 0.008 inches thick. Notch 32 is approximately 0.10 inches long and 0.150 inches wide. Spring 29 is made of spring steel.

Figure 5:
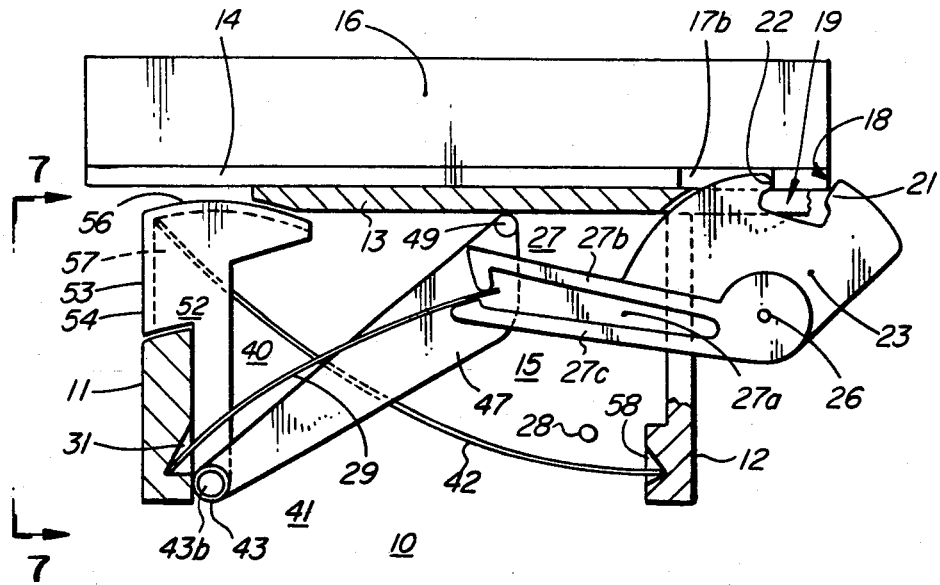
FIG. 5 is similar to FIG. 2 but additionally depicts a release mechanism.

FIG. 5 is similar to FIG. 2 except that a release mechanism 40 is additionally depicted. Release mechanism 40 is comprised of a solid one piece link member 42 and a buckling column spring 42.

Link member 41 (also shown in FIGS. 7 and 8 to which attention is directed) is one solid piece which moves as a single entity. To be more precise, link member 41 is comprised of a shaft 43 having ends 43a and 43b of reduced diameter. The ends 43a and 43b fit into recesses (not shown) in housing 10 so as to allow link member 41 to pivot about the longitudinal axis 44 of shaft 43. Link member 41 additionally includes arms 46 and 47 which in turn support studs 48 and 49 respectively.

Arms 51 and 52 of link member 41 support a push-bar 53. Push-bar 53 has a front wall 54 and a top wall 56. Walls 54 and 56 together with the ends of arms 51 and 52 form a pocket 57 into which one end of spring 42 (FIGS. 5 and 6) fits and is retained.

Returning to FIG. 5, it can be seen that tape cartridge 16 is in its latched position. Cam 23 is in its second stable position with tang 22 bearing against the front surface of notch 17b. In FIG. 5, release mechanism 40 is playing no active role in latching cartridge 16; in fact, there is no direct physical contact between latching mechanism 15 and release mechanism 40. Spring 42, having its one end in pocket 57 of link member 41 and having its other end in notch 58 of wall 12, maintains stud 49 out of contact with lever arm 27.

Figure 6:
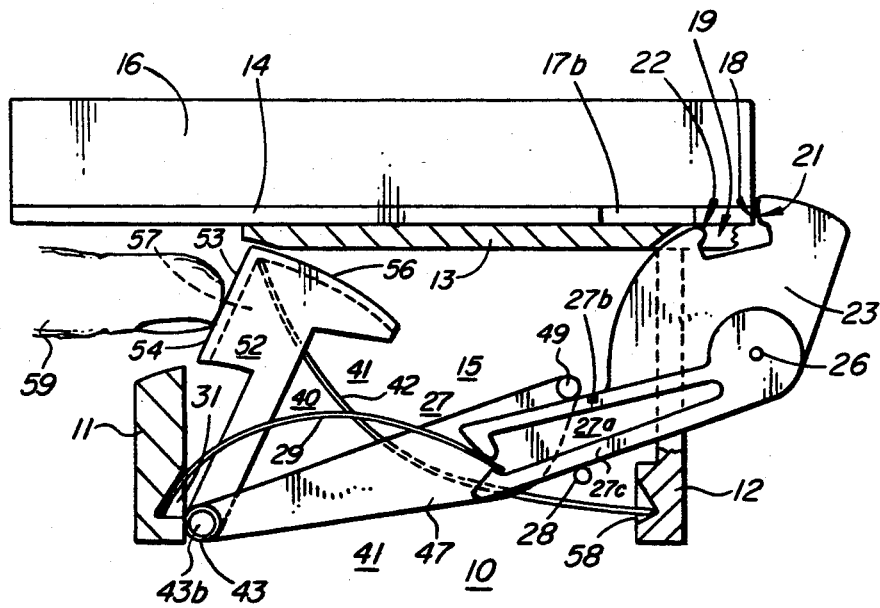
FIG. 6 is similar to FIG. 5, but depicts the cartridge being discharged.

When the discharge of cartridge 16 is desired, a finger 59 pushes against bar 53, as depicted in FIG. 6, and causes link member 41 to rotate about axis 44 of shaft 43. This causes stud 49 to contact lever arm 27 as shown in FIG. 6 with the result that cam 23 rotates about pivot pin 26 to reach its first stable position. As cam 23 moves from its second stable position to its first stable position, tang 21 of cam 23 contacts leading edge 18 of baseplate 14 and forces baseplate 14 (and consequently cartridge 16) to the left in FIG. 6 with the result that cartridge 16 is discharged from tape cartridge holder 24.

Figure 7:
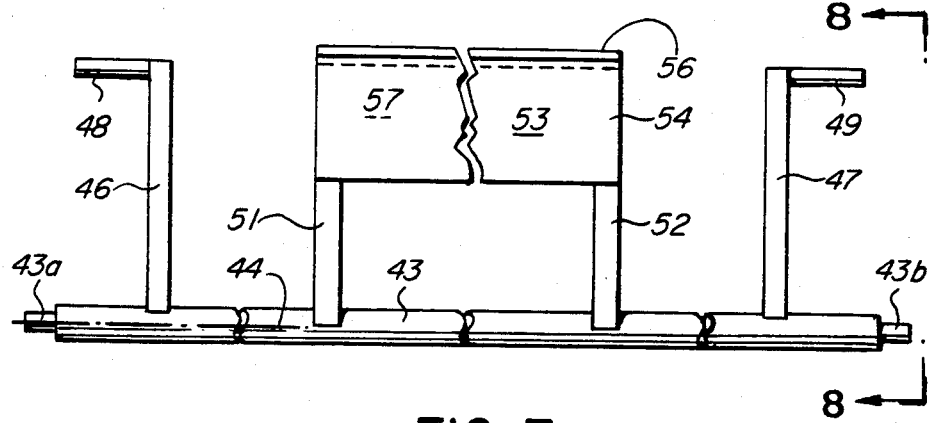
FIG. 7 is one view of the release mechanism of FIGS. 5 and 6 taken along the section line 7—7 of FIG. 5.
Figure 8:
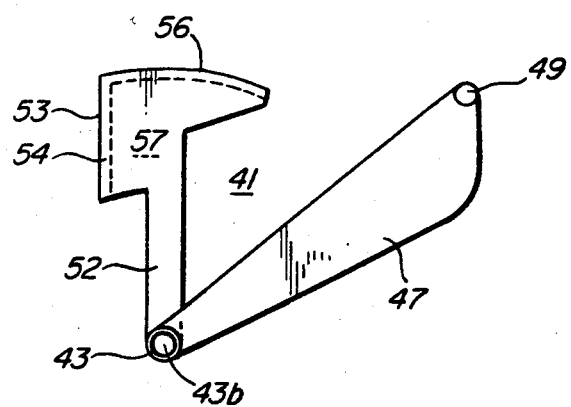
FIG. 8 is an end view of the mechanism of FIG. 7, taken along the section line 8—8.

In FIG. 7, shaft 43 is 6.0 inches long (including ends 43a and 43b) and is 0.25 inches in diameter. Ends 43a and 43b are each 0.1 inches long and 0.188 inches in diameter. Arms 46 and 47 are each 2.0 inches long and studs 48 and 49 are each 0.40 inches long and 0.12 inches in diameter. Arms 51 and 52 are 1.0 inches long and are spaced apart approximately 2.0 inches. Link member 41 is made of polyester, and cam 23 (FIGS. 1, 2, 5 and 6) is made of nylon.

What is claimed is:

1. A latching mechanism for latching a cartridge into a holder, said mechanism comprising:
   a camming member situated so as to be able to engage a notch in said cartridge;
   said camming member having a first surface contacted by the forward edge of the cartridge both during the insertion of said cartridge and during the discharge of said cartridge, and a second surface for engaging said notch in said cartridge so as to urge said cartridge into said holder, thereby providing the latching function;
   said camming member being pivoted about a pivot point and having a first stable position and a second stable position;
   a first buckling column spring having one end secured to a lever arm protruding from said camming member and having its other end fixed such that said first buckling column spring biases said camming member to its first stable position when there is no cartridge in said holder and biases said camming member to its second stable position when a cartridge is properly positioned in said holder;
   said latching mechanism further including a release mechanism comprising:
   a pivoted member which selectively contacts said lever arm of said camming member so as to force said camming member from said second stable position to said first stable position; and
   a second buckling column spring having one end secured to said pivoted member and having its other end fixed such that said second buckling column spring biases said pivoted member away from said lever arm of said camming member.

2. A device for latching a tape cartridge into a holder, said device comprising:
   two camming members, each spaced apart so as to be able to engag notches in opposite sides of said cartridge;
   each said camming member having a first surface contacted by the forward edge of the cartridge both during the insertion of said cartridge and during the discharge of said cartridge, and a second surface for engaging a notch in said cartridge so as to urge said cartridge into said holder, thereby providing the latching function;
   each said camming member being pivoted about a respective pivot point and having a first stable position and a second stable position;
   a buckling column spring for each said camming member, said spring having one end secured to a lever arm protruding from said camming member and having its other end fixed such that said spring biases said camming member to its first stable position when there is no cartridge in said holder and biases said camming member to its second stable position when a cartridge is properly positioned in said holder;
   device further including a release mechanism for unlatching said camming members comprising:
   a pivoted member which selectively contacts both lever arms of said two camming members so as to force said camming members from said second stable position to said first stable position; and
   an additional buckling column spring having one end secured to said pivoted member and having its other end fixed such that said additional buckling column spring biases said pivoted member away from said lever arm of said camming member.

* * * * *